United States Patent
Poorman et al.

(10) Patent No.: US 6,373,656 B2
(45) Date of Patent: Apr. 16, 2002

(54) WEAR RESISTANT MAGNETIC WRITE HEAD

(75) Inventors: Paul Poorman, Meridian; Stephan Howe, Boise, both of ID (US); Patricia A. Beck, Mountain View, CA (US); George M. Clifford, Jr., Los Altos Hills, CA (US); Richard H. Henze, San Carlos, CA (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/811,070

(22) Filed: Mar. 16, 2001

Related U.S. Application Data

(63) Continuation of application No. 09/313,889, filed on May 18, 1999, now Pat. No. 6,236,537, which is a continuation-in-part of application No. 08/959,509, filed on Oct. 28, 1997, now Pat. No. 6,018,444.

(51) Int. Cl.[7] .............................................. G11B 5/187
(52) U.S. Cl. ...................................... 360/122; 360/125
(58) Field of Search ............................... 360/119, 122, 360/121, 125, 126

(56) References Cited

U.S. PATENT DOCUMENTS

| | | | | |
|---|---|---|---|---|
| 3,737,582 A | * | 6/1973 | DeMoss ..................... 360/122 |
| 4,251,297 A | * | 2/1981 | Kawabata et al. ........... 148/121 |
| 4,638,387 A | * | 1/1987 | Mukasa et al. .............. 360/122 |
| 4,638,391 A | * | 1/1987 | Hatanai et al. .............. 360/125 |
| 4,652,955 A | * | 3/1987 | Niwa et al. .................. 360/121 |
| 5,031,064 A | * | 7/1991 | Ashikawa et al. ........... 360/122 |
| 5,055,959 A | * | 10/1991 | Saliba ......................... 360/122 |
| 5,694,277 A | * | 12/1997 | Lee ............................. 360/119 |
| 5,781,383 A | * | 7/1998 | Strand ........................ 360/122 |
| 5,815,910 A | * | 10/1998 | Park et al. ................ 29/603.16 |
| 6,031,694 A | * | 2/2000 | Tamura et al. .............. 360/122 |
| 6,118,626 A | * | 9/2000 | Muftu et al. ................ 360/122 |

FOREIGN PATENT DOCUMENTS

| | | | |
|---|---|---|---|
| EP | 0737961 | * | 10/1996 |
| JP | 63-79202 | * | 4/1988 |

* cited by examiner

*Primary Examiner*—Jefferson Evans

(57) ABSTRACT

A head design that reduces wear at the leading and trailing edges where the tape contacts the head while minimizing any adverse effects on the performance of the head. In one embodiment of the invention, a localized layer of wear resistant material is formed on the leading edge where the tape contacts the head before passing over the head recording surface. In a second embodiment, the leading edge is formed as wear resistant material embedded in the head structure adjacent to the recording surface. And, in a third embodiment, the leading edge is formed as a wear resistant material strip affixed to the side of the head structure. For each embodiment, the wear resistant material may also be applied in the manner described to the trailing edge where the tape may also contact the head after passing over the recording surface.

16 Claims, 8 Drawing Sheets

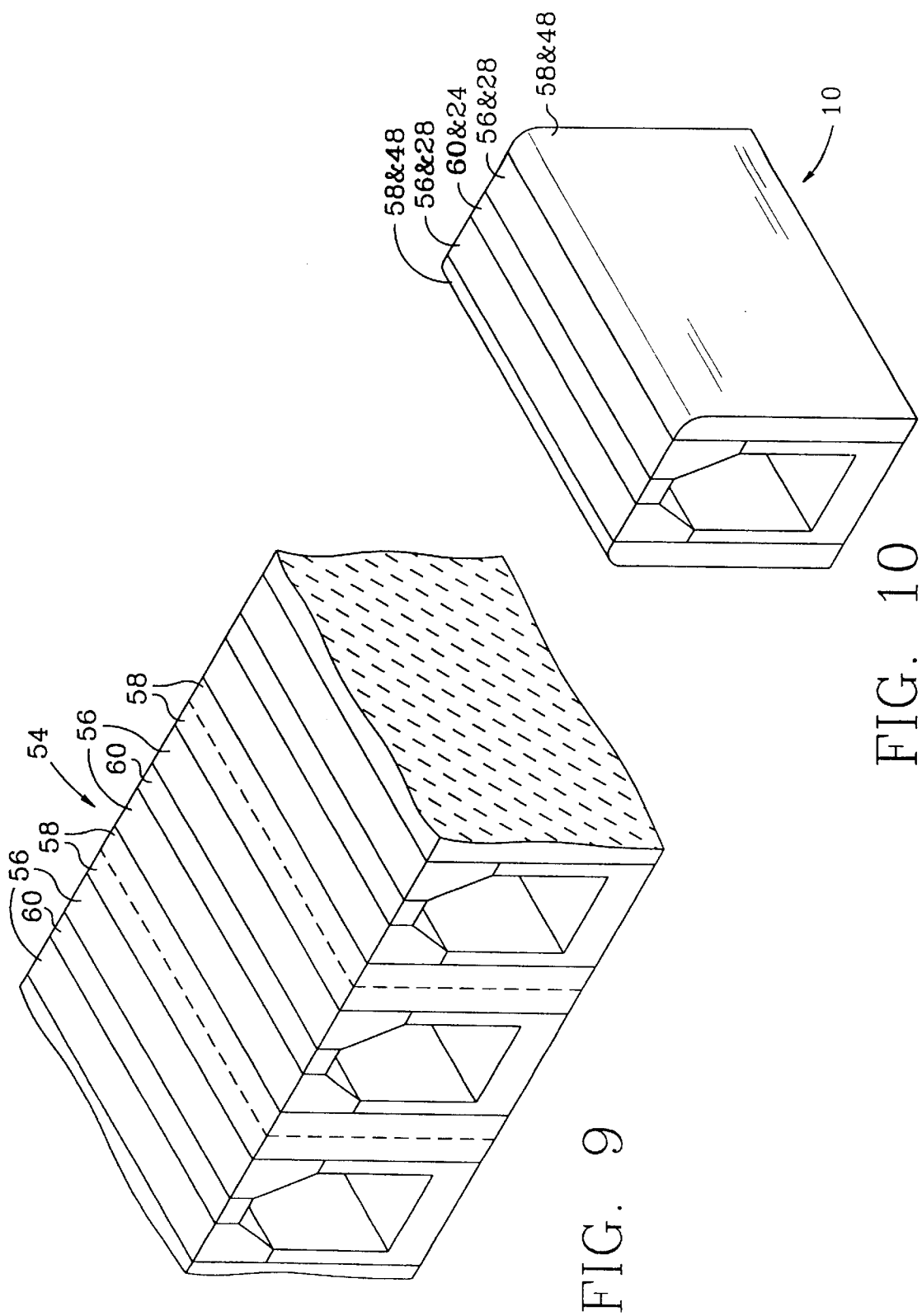

WEAR RESISTANT MAGNETIC WRITE HEAD

CROSS REFERENCE TO RELATED APPLICATION

This is a continuation of application Ser. No. 09/313,889, filed May 18, 1999, now U.S. Pat. No. 6,236,537, titled Wear Resistant Magnetic Write Head, which is a continuation in part of application Ser. No. 08/959,509, filed Oct. 28, 1997, now U.S. Pat. No. 6,018,444, titled Batch Fabricated Servo Write Head which is incorporated herein by reference in its entirety.

FIELD OF THE INVENTION

The invention relates in general to recording/writing on magnetic storage media and, more particularly, to an improved servo write head for writing servo patterns on magnetic tape.

BACKGROUND OF THE INVENTION

With ever denser data, recording and reading data on magnetic storage media requires increasingly precise positioning of magnetic read and write heads. Data is often written in parallel tracks. The read/write heads must be moved quickly and positioned over particular data tracks as data is read or recorded. The magnetic heads record and read data as relative movement occurs between the heads and the magnetic storage media in a transducing, usually lengthwise, direction. The heads are generally moved from one track to another track across the width of the tracks in a translating direction. For example, a magnetic tape typically contains data tracks that extend along the length of the tape parallel to the tape edges in the transducing direction. The heads move from track to track in the translating direction across the tape from edge to edge.

Storage devices that read and record data on magnetic media can use servo control systems to properly position the heads in the translating direction. High performance linear tape drives are beginning to implement closed-loop servo systems for track following in order to record at high area densities. The servo control systems derive a position signal from a magnetic servo read head that reads servo position information recorded in servo tracks on the storage media. Servo position information is recorded on magnetic tapes, for example, as part of the pre-formatting process between manufacture of raw blank tape and end user packaged tape cartridges. A magnetic servo write head in a servo writer machine records the servo information on the tape, usually in bulk before the tape is cut and assembled into cartridges. One such servo write head and a corresponding servo position system is described in U.S. Pat. No. 5,689,384 titled Timing Based Servo System For Magnetic Tape Systems.

U.S. patent application Ser. No. 08/959,509 titled Batch Fabricated Servo Write Head describes a servo write head that may be fabricated in batches rather than individually as in prior art servo write heads. Referring to FIGS. 1 and 2, the batch fabricated servo write head 100 of the '509 application includes a flat tape recording surface 102 on a thin layer 104 of high moment magnetic material and rounded leading and trailing edges 106 and 108. Servo patterning gaps 110 are formed in layer 104 at the center of bearing surface 102. Tape 112 contacts head 100 at the leading and trailing edges 106 and 108. It has been discovered that excessive wear along the leading and trailing edges may occur from the contact with tape 112. Excessive wear can generate debris that can clog the tape/head interface at recording surface 102 or scratch tape 112. Excessive wear can also alter the shape of the head at leading and trailing edges 106 and 108 resulting in an undesirable contour with increased tape/head spacing. Moreover, excessive wear may cause the thin magnetic layer 104 to peel if its edge coincides with the head/tape contact region at leading and trailing edges 106 and 108.

Prior solutions to the problem of excessive head wear generally include the widened head pads described in U.S. Pat. No. 5,055,959 titled Tape Head With Low Spacing Loss Produced By Narrow And Wide Wear Regions, applying wear resistant coatings to the entire head, and the "contact" head described in the '384 patent. The '959 patent describes a servo write head that utilizes widened pads to reduce the contact pressure between the tape and the head. Widened head pads, however, are not practical in radiused edge/flat servo write heads such as the batch fabricated heads shown in FIGS. 1 and 2. Although the application of a wear resistant coating to the entire head as shown in FIG. 14 of the '509 application may be effective in reducing wear, the coating is less desirable because it increases the magnetic spacing between the tape and the head which may reduce the effectiveness of the head recording servo patterns on the tape. The contact head described in the '384 patent, which presumably just wears down until it no longer functions, is undesirable due to the comparatively short useful life and the potential changes to the recording characteristics as the head wears.

SUMMARY OF THE INVENTION

Accordingly, the present invention is directed to a head in which the leading and/or trailing edges are constructed with wear resistant material to reduce wear at the locations where the tape contacts the head while minimizing any adverse effects on the performance of the head that is recording servo data on the tape. In one embodiment of the invention, a localized layer of wear resistant material is formed on the leading edge where the tape contacts the head before passing over the head recording surface. In a second embodiment, the leading edge is formed from wear resistant material embedded in the head structure adjacent to the recording surface. And, in a third embodiment, the leading edge is formed as a wear resistant material strip affixed to the side of the head structure. For each embodiment, the wear resistant material may also be applied in the manner described to the trailing edge where the tape may also contact the head after passing over the recording surface.

The use of wear resistant materials at the leading and trailing edges as summarized above will reduce wear while helping to maintain the desired spacing between the head recording surface and the tape over the full life of the head. The invention should also help reduce or eliminate debris from the head that might otherwise be generated during the servo recording process which, in turn, should help minimize head clogging and tape scratching. For those types of heads that use a thin layer of magnetic material embedded in or applied to the head structure at the recording surface, such as that shown in FIGS. 1 and 2, the invention should help reduce or eliminate the potential for this magnetic layer to delaminate from the base head structure at the leading or trailing edges.

DESCRIPTION OF THE DRAWINGS

FIG. 9 is a perspective view of a ferrite wafer from which individual head structures are cut during a batch fabrication process in which the wear resistant material strips extend the full height of the wafer.

FIG. 10 is a perspective view of an individual head structure cut from the wafer of FIG. 9.

Cross hatching has been omitted from many of the section views for clarity.

DETAILED DESCRIPTION OF THE INVENTION

While the below description describes a servo write head, the present invention is not intended to be limited to use in only servo write heads. The present may be used for any magnetic read or write or read/write head.

Figure 1:
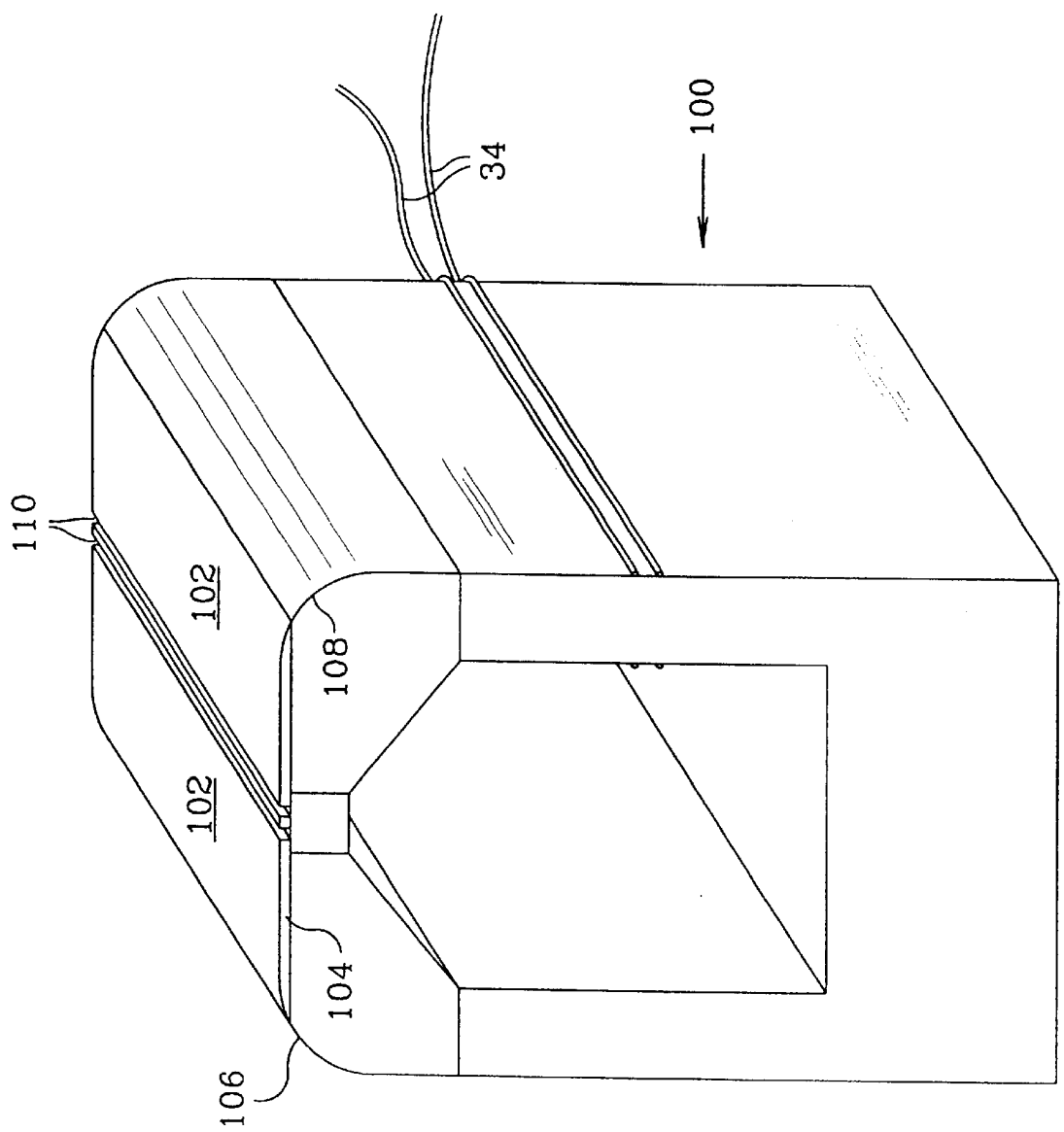
FIG. 1 is a perspective partial section view of a servo write head described in application Ser. No. 08/959,509, filed Oct. 28, 2997, titled Batch Fabricated Servo Write Head.
Figure 2:
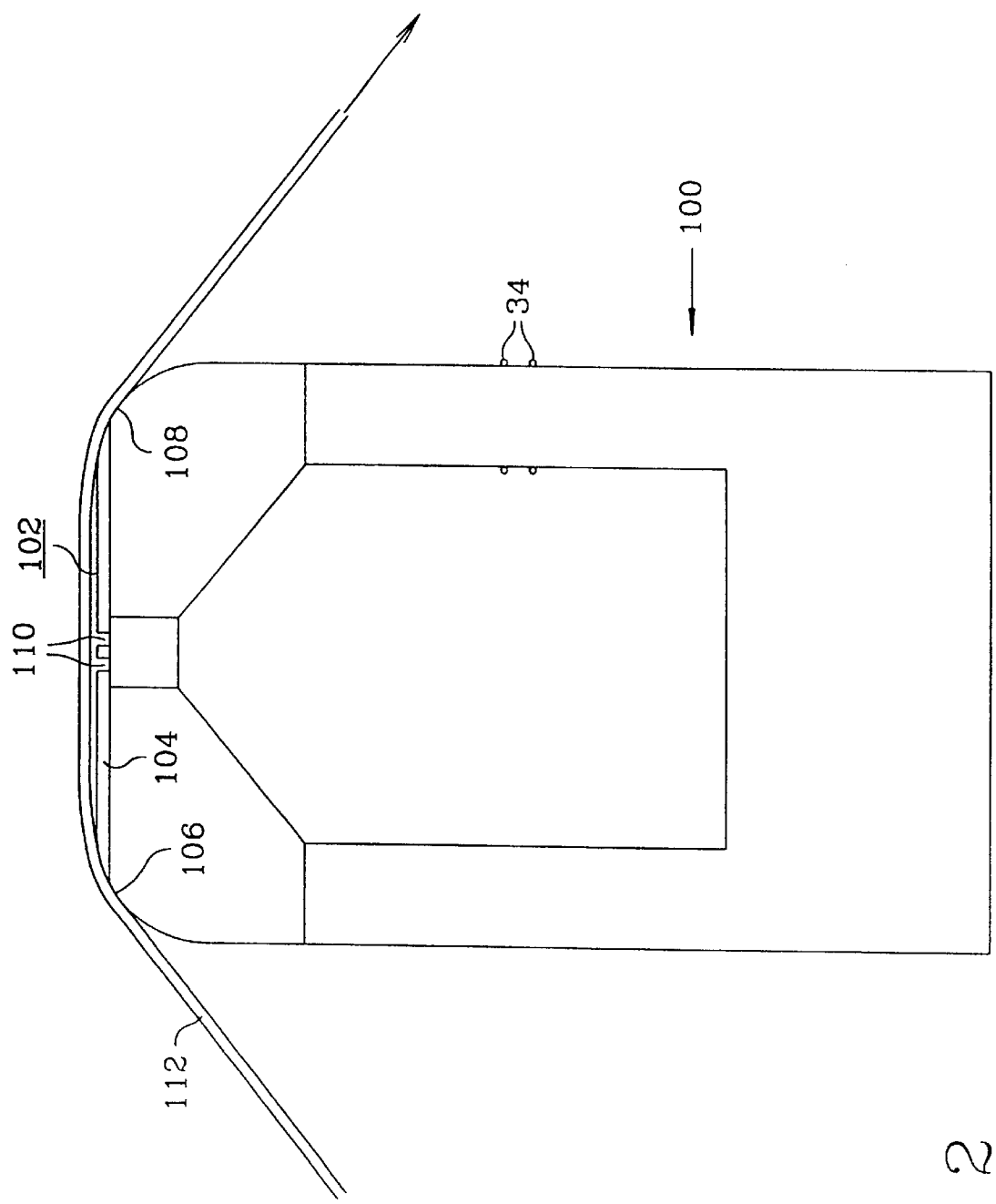
FIG. 2 is an end section view of the servo write head of FIG. 1.
Figure 3:
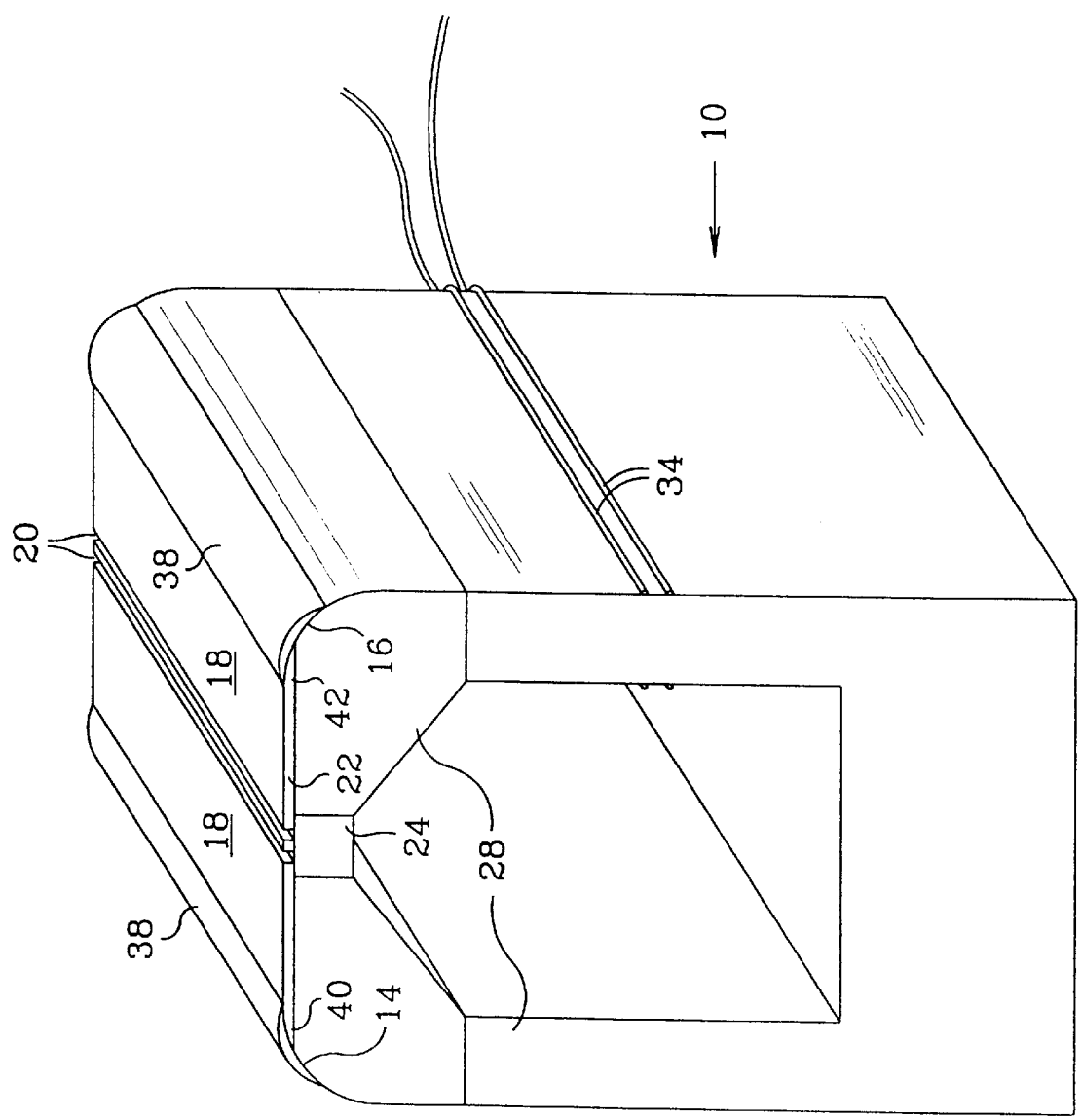
FIG. 3 is a perspective partial section view of a servo write head constructed according to one embodiment of the invention in which a localized layer of wear resistant material is formed on the head at the leading and trailing edges.
Figure 4:
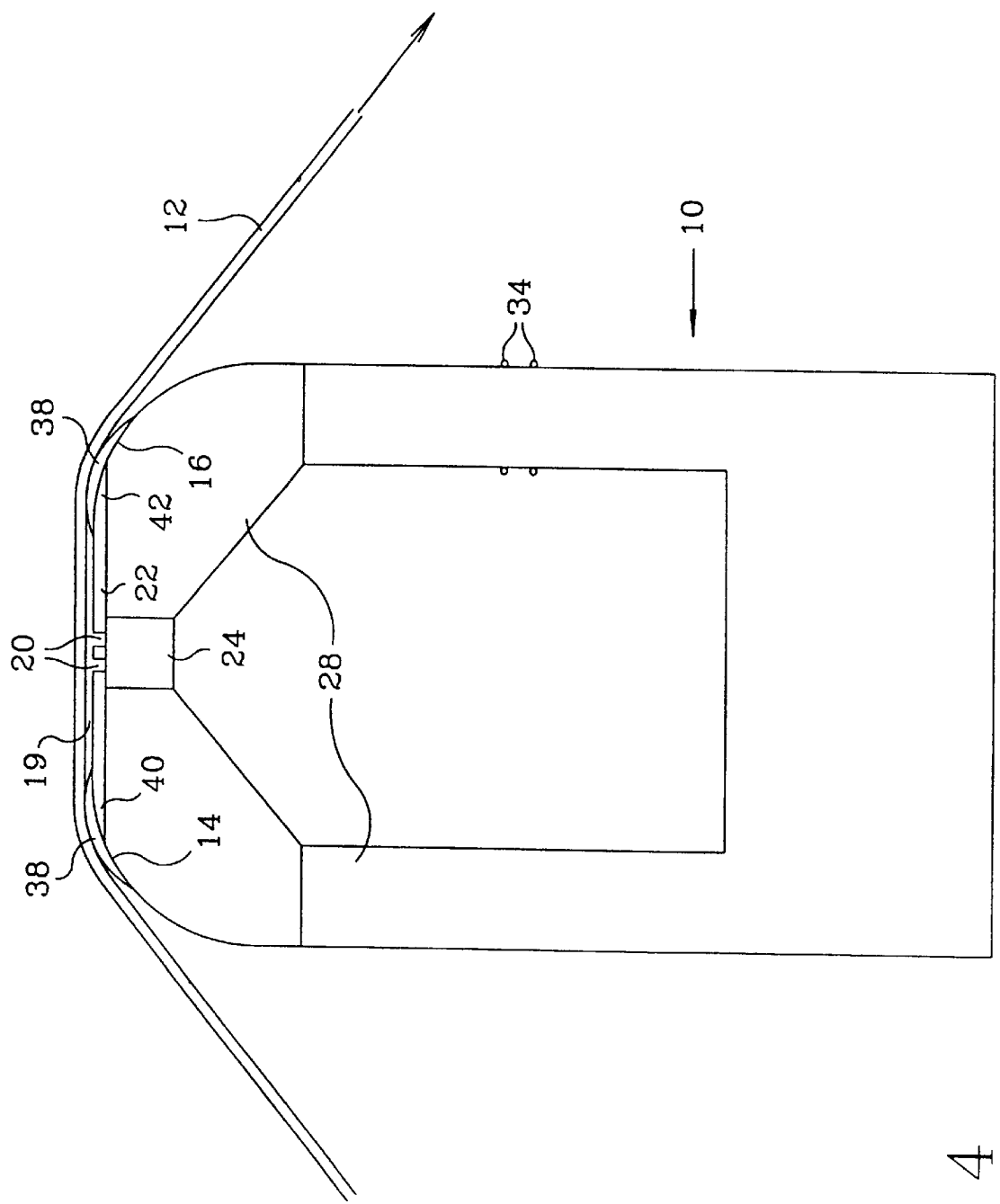
FIG. 4 is an end section view of the servo write head of FIG. 3.

FIGS. 3 and 4 illustrate a servo write head 10 constructed according to one embodiment of the invention in which a wear resistant material is formed on the head at the leading and trailing edges where the tape may contact the head. Referring to FIGS. 2 and 3, magnetic recording tape 12 contacts head 10 at a curved leading edge 14 and a curved trailing edge 16. Tape 12 travels over a flat recording surface 18 at the center of head 12 supported by an air bearing formed in the space 19 between tape 12 and head 10. "Recording surface" as that term is used in this Specification and in the claims refers generally to the planar area including the center portion of the head in which magnetic flux is generated to record servo patterns on to the tape. Magnetic gaps 20 are formed in a desired pattern near the center of head 10 to record servo information on tape 12. "Formed" or "form" or "forming" as those terms are used in this Specification and in the claims refers generally to any process in which materials are applied, removed or otherwise processed to obtain the desired structure. Additive forming processes include, for example, deposition, plating and the like. Subtractive processes include, for example, etching, cutting, ablating and the like. Gaps 20 are formed in layer 22 of high moment magnetic material formed over a non-magnetic spacer 24 as described in application Ser. No. 08/959,509. Suitable materials for layer 22 include, for example, iron aluminum nitride (FeAlN), iron tantalum nitride (FeTaN) and nickel iron (NiFe).

Head 10 includes a horseshoe shaped area 28 of magnetic material, typically ferrite, separated by non-magnetic spacer 24. Spacer 24 may be made of any suitable non-magnetic material such as glass, calcium-titanite or even air.

A coil of conductive windings 34 is wound around a portion of horseshoe area 28, generally along the side as shown in FIGS. 3–6. The width of spacer 24 will typically be 100–500 microns. The magnetic flux produced by the write current is then largely confined to magnetic layer 22.

In the embodiment of the invention shown in FIGS. 3 and 4, a layer 38 of wear resistant material is formed at leading and trailing edges 14 and 16 where tape 12 contacts head 10. Wear layers 38 cover leading edge 14 and trailing edge 16. For head designs in which transition areas 40 and 42 between magnetic layer 22 and ferrite areas 28 are at or very near leading and trailing edges 14 and 16 as shown in FIG. 4, then wear layers 38 should also cover transition areas 40 and 42. Any suitable wear resistant material that can be made to adhere to, bond with or otherwise be applied to head structures (ferrite areas 28 and magnetic layer 22 in FIGS. 3 and 4) may be used for wear layers 38. Diamond-Like carbon, for example, is one material suitable for wear layers 38. It is expected from simulation modeling that Diamond-Like carbon wear layers up to the order of 1.0 micron thick could be used without adversely affecting the spacing between head 10 and tape 12 at gaps 20. The thickness of wear layers 38 may vary depending on such factors as tape speed, head curvature, the degree of wear resistance of the wear resistant material and various processing parameters.

In the batch fabrication processes described in application Ser. No. 08/959,509, wear layers 38 will usually be formed after magnetic layer 22. Wear layers 38 may be formed by deposition, lamination, plating, growing and similar techniques well known to those skilled in the art of thin film fabrication. The center portion of head 10 is masked or otherwise protected during the formation of wear layers 38 to keep the recording surface free of wear resistant material to avoid spacing loss. Alternatively, if the wear resistant material is applied fully across the head, it may be etched back to the leading edge areas to clear the writing area of the head.

Figure 5:
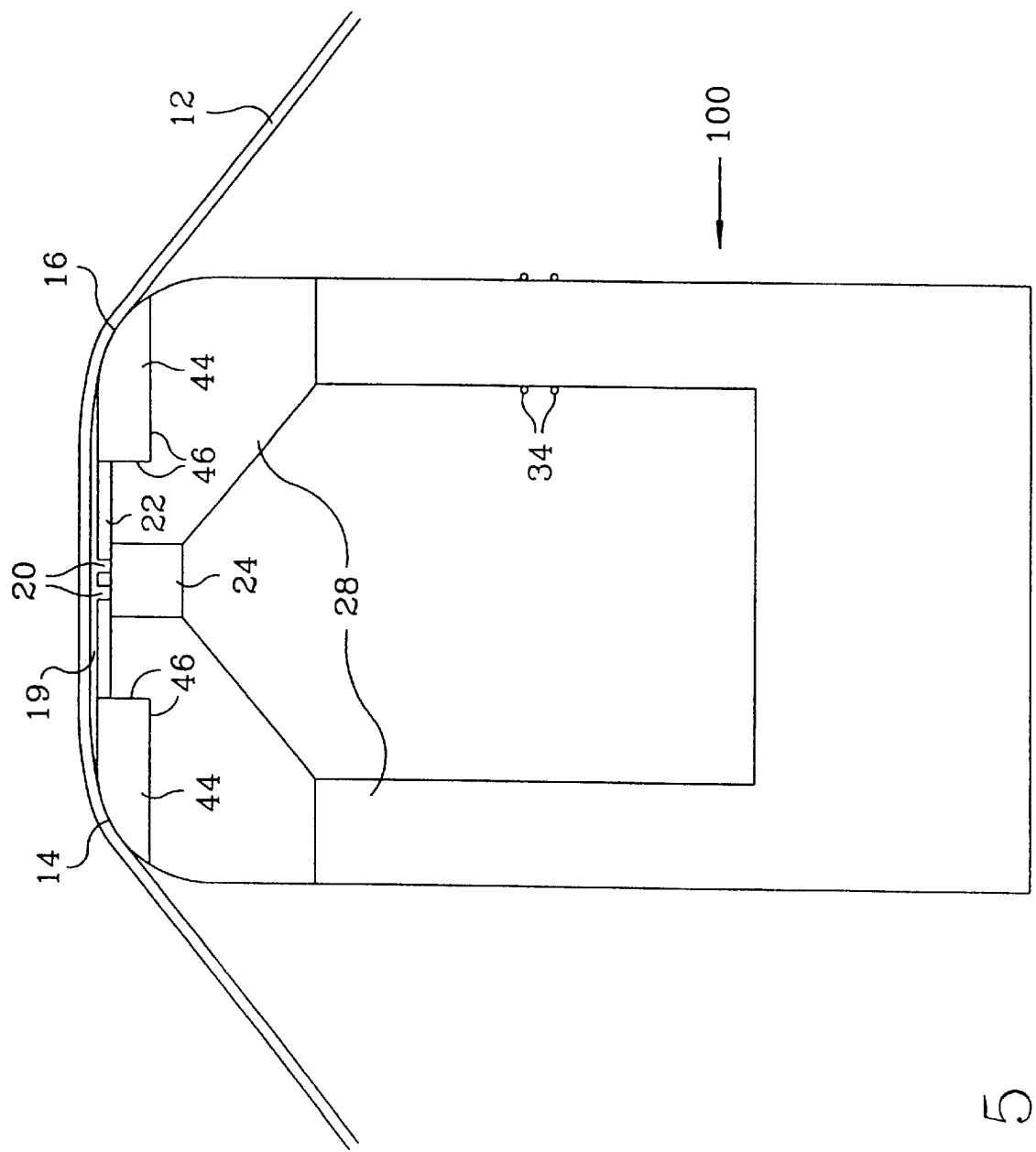
FIG. 5 is an end section view of a servo write head constructed according to a second embodiment of the invention in which a wear resistant material is embedded in the head at the leading and trailing edges.
Figure 6:
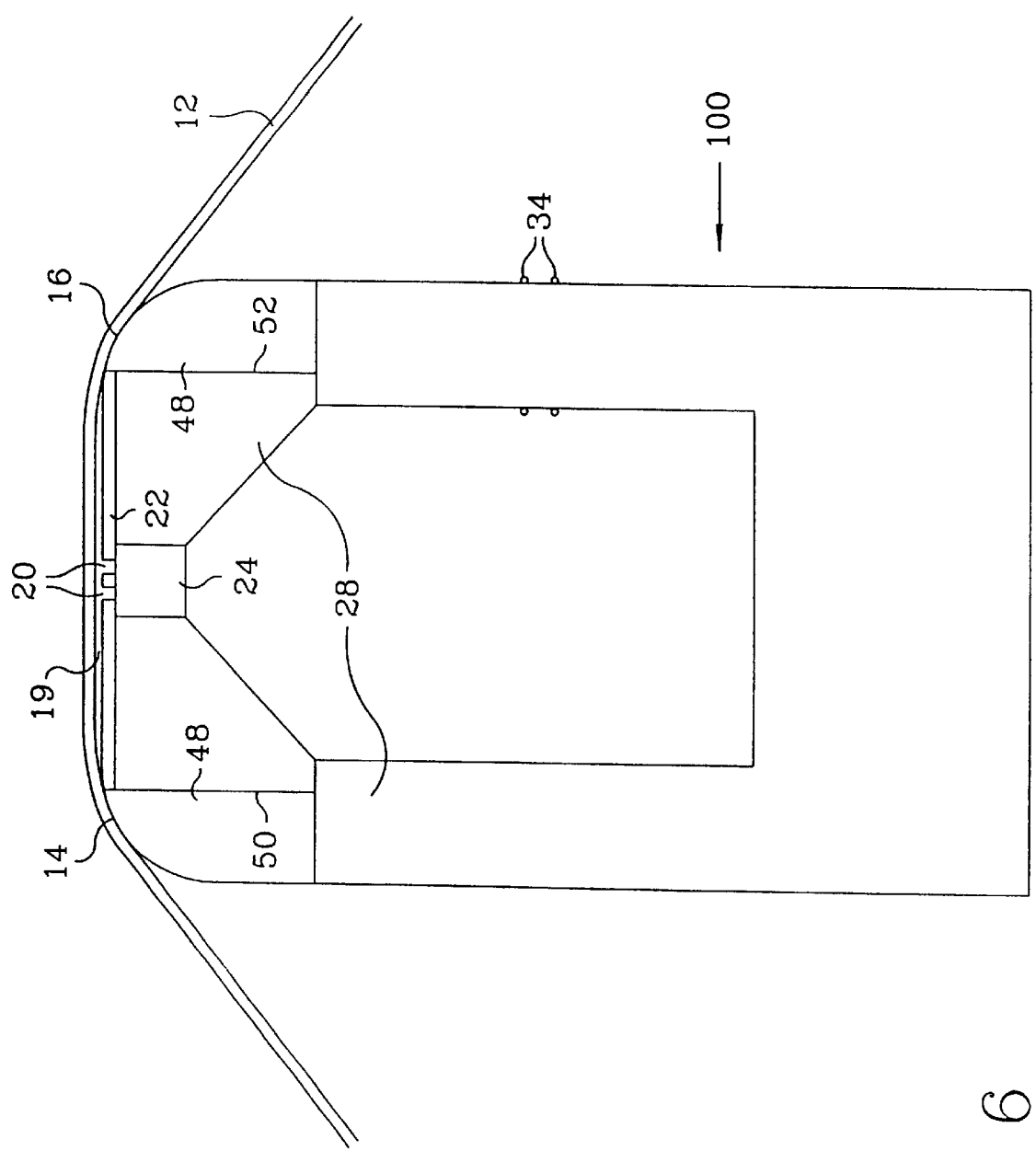
FIG. 6 is an end section view of a servo write head constructed according to a third embodiment of the invention in which a wear resistant material is formed along each side of the head at the leading and trailing edges.

FIGS. 5 and 6 illustrate alternative embodiments of the invention in which wear resistant material blocks 44 (in FIG. 5) and strips 48 (in FIG. 6) are formed along each side of head 10 at leading and trailing edges 14 and 16. Blocks 44 and strips 48, which represent two shape variations of the same basic configuration, are made of aluminum oxide-titanium carbide ($Al_2O_3$—TiC) or another suitable wear resistant material. Other shape variations are possible. A round rod, for example, could also be inserted into head 10 at the leading and trailing edges 14 and 16.

In the batch fabrication processes described in application Ser. No. 08/959,509, wear blocks 44 are formed in recesses 46 sculptured in ferrite areas 28. Wear blocks 44 may be formed before or after formation of magnetic layer 22. Wear blocks 44 may be formed as prefabricated inserts placed in recesses 46 or by filling the recesses and then shaping the blocks. Other suitable formation techniques could also be used. Wear blocks 44 are contoured to form the desired leading and trailing edges 14 and 16 as described in application Ser. No. 08/959,509.

In the batch fabrication processes described in application Ser. No. 08/959,509, wear strips 48 are laminated or otherwise affixed or bonded to sides 50 and 52 of ferrite areas 28. Wear strips 48 may be formed before or after formation of magnetic layer 22. Like the wear blocks described above, wear strips 48 are contoured to form the desired leading and trailing edges 14 and 16 as described in application Ser. No. 08/959,509.

Figures 7, 8:
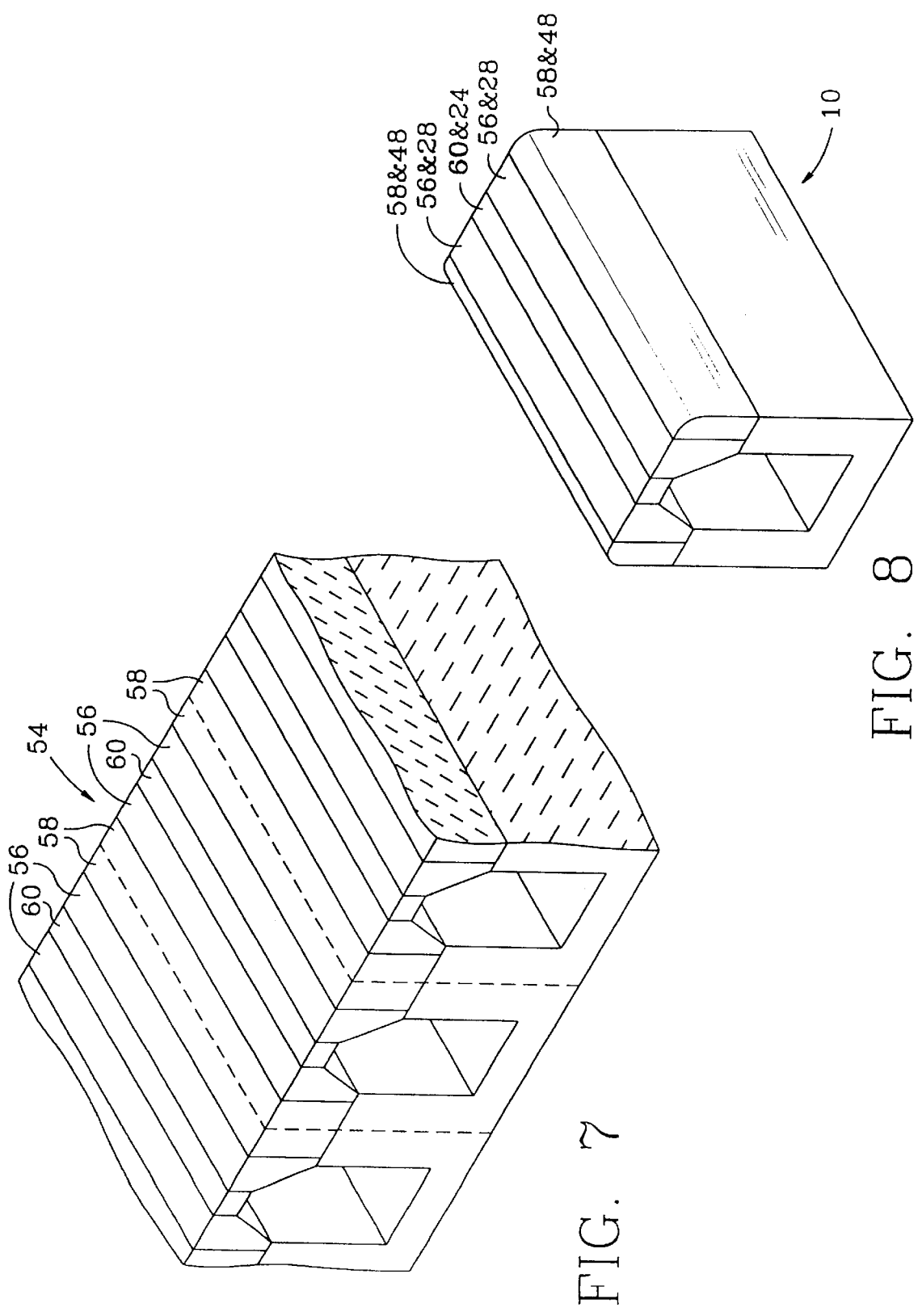
FIG. 7 is perspective view of a ferrite wafer from which individual head structures are cut during a batch fabrication process.
FIG. 8 is a perspective view of an individual head structure cut from the wafer of FIG. 7.

One technique that might be used to form wear strips 48 are part of a batch fabrication process for multiple heads 10 is illustrated in FIGS. 7 and 8 and 9 and 10. FIGS. 7 and 9 show a laminated wafer 54 that includes layers of ferrite 56, wear resistant material 58 and non-magnetic material 60. In FIG. 7, wear resistant material 58 extends only along the top portion of wafer 54. In FIG. 9, wear resistant material 58 extends the full height of wafer 54. The ferrite and non-magnetic layers on wafer 54 in FIGS. 7 and 9 have already been formed into the general shape of multiple heads 10. As shown in FIGS. 8 and 10, each head 10 is sawn lengthwise from wafer 54 by cutting through wear layers 58 as indicated by the dotted lines in FIGS. 7 and 9 (any cross cuts will cross wear layer 58). Wear layers 58 can then be contoured as described above to form the desired leading and trailing edges 14 and 16.

While the present invention has been shown and described with reference to the foregoing embodiments, it is to be understood that other forms and details may be made thereto without departing from the spirit and scope of the invention. For example, the use of a wear resistant film covering the leading edges or forming the leading edges from a wear resistant material is not limited to the radiused edge/flat profile type head shown and described. Also, while it is expected the invention can be most readily implemented through the batch fabrication techniques described in application Ser. No. 08/959,509, the invention could be used in heads that are manufactured individually. The invention could also be useful for wear reduction with other head contours. It should be understood, therefore, that the invention is to be construed broadly within the scope of the following claims.

What is claimed is:

1. A head for magnetic tape, comprising:

a head structure;

a recording surface defined by a layer of magnetic material disposed along an exposed outer surface of the head structure;

a rounded leading edge disposed adjacent to the recording surface such that the tape contacts the leading edge before passing over the recording surface; and a first layer of wear resistant material on the leading edge and covering a portion of the layer of magnetic material.

2. The head of claim 1, further comprising:

a rounded trailing edge disposed adjacent to the recording surface such that the tape passes over the trailing edge after passing over the recording surface; and a second layer of wear resistant material on the trailing edge and covering a portion of the layer of magnetic material.

3. The head of claim 2, wherein the wear resistant material comprises Diamond-Like carbon.

4. The head of claim 2, wherein the recording surface is substantially planar and a portion of each layer of wear resistant material extends out from the plane of the recording surface.

5. The head of claim 1, wherein the wear resistant material comprises Diamond-Like carbon.

6. The head of claim 1, wherein the recording surface is substantially planar and further comprising an air bearing between the recording surface and the tape.

7. A head for magnetic tape, comprising:

a head structure;

a recording surface defined by a layer of magnetic matieral disposed along an exposed outer surface of the head structure; and a rounded leading edge defined by wear resistant material embedded in the head structure adjacent to and abutting the recording surface such that the tape contacts the leading edge before passing over the recording surface.

8. The head of claim 7, wherein the wear resistant material comprises aluminum oxide-titanium carbide ($Al_2O_3$—TiC).

9. The head of claim 7, further comprising a rounded trailing edge defined by wear resistant material embedded in the head structure adjacent to and abutting the recording surface such that the tape passes over the trailing edge after passing over the recording surface.

10. The head of claim 9, wherein the wear resistant material comprises aluminum oxide-titanium carbide ($Al_2O_3$—TiC).

11. The head of claim 7, wherein the recording surface is substantially planar and further comprising an air bearing between the recording surface and the tape.

12. A head for magnetic tape, comprising:

a head structure;

a recording surface defined by a layer of magnetic material disposed along an exposed outer surface of the head structure;

a rounded leading edge comprising a wear resistant material strip disposed on a first side of the head structure adjacent to and abutting the recording surface such that the tape contacts the leading edge before passing over the recording surface.

13. The head of claim 12, wherein the wear resistant material comprises aluminum oxide-titanium carbide ($Al_2O_3$—TiC).

14. The head of claim 12, further comprising a rounded trailing edge comprising a wear resistant material strip disposed on a second side of the head structure adjacent to and abutting the recording surface such that the tape passes over the trailing edge after passing over the recording surface.

15. The head of claim 14, wherein the wear resistant material comprises aluminum oxide-titanium carbide ($Al_2O_3$—TiC).

16. The head of claim 12, wherein the recording surface is substantially planar and further comprising an air bearing between the recording surface and the tape.

* * * * *

UNITED STATES PATENT AND TRADEMARK OFFICE
CERTIFICATE OF CORRECTION

PATENT NO. : 6,373,656 B2
DATED : April 16, 2002
INVENTOR(S) : Paul Poorman et al.

It is certified that error appears in the above-identified patent and that said Letters Patent is hereby corrected as shown below:

Column 6,
Line 9, delete "mati-"
Line 10, delete "eral" and insert therefor -- material --

Signed and Sealed this

Twenty-first Day of September, 2004

JON W. DUDAS
*Director of the United States Patent and Trademark Office*